United States Patent [19]

Camp

[11] 3,984,936
[45] Oct. 12, 1976

[54] DISPOSABLE ANIMAL TRAP

[76] Inventor: Russell John Camp, 24001 Muirlands, El Toro, Calif. 92630

[22] Filed: Apr. 30, 1975

[21] Appl. No.: 573,096

[52] U.S. Cl. ................................................. 43/66
[51] Int. Cl.² ....................................... A01M 23/18
[58] Field of Search ............... 43/66, 65, 61, 60, 64, 43/58

[56]  References Cited
UNITED STATES PATENTS

| | | | |
|---|---|---|---|
| 1,033,761 | 7/1912 | Kampfe | 43/61 |
| 1,941,242 | 12/1933 | Bechtel et al. | 43/65 |
| 2,950,562 | 8/1960 | Lothrop | 43/66 |
| 3,733,735 | 5/1973 | Hirsch | 43/61 |

*Primary Examiner*—Warner H. Camp
*Attorney, Agent, or Firm*—Gary Appel

[57] ABSTRACT

A disposable trap for animals such as mice comprises a cap assembly which is adapted for one end of a receptacle such as a beverage can. The cap assembly includes a flanged end plate having an entrance opening in a lower portion thereof, and an opening cover. The opening cover has a lower portion which covers the opening in the end plate and overlaps the end plate around the opening to form a one way door, and a narrow elongate upper portion which functions as a leaf spring to urge the lower portion to cover the end plate opening after the animal has entered the trap. A groove formed in the end plate flange fits into a mating groove present on most common beverage cans to prevent unintentional removal of the cap assembly from the can. Bent over tabs may replace the flange, and bent down tabs may be provided to prevent rolling of the trap.

6 Claims, 5 Drawing Figures

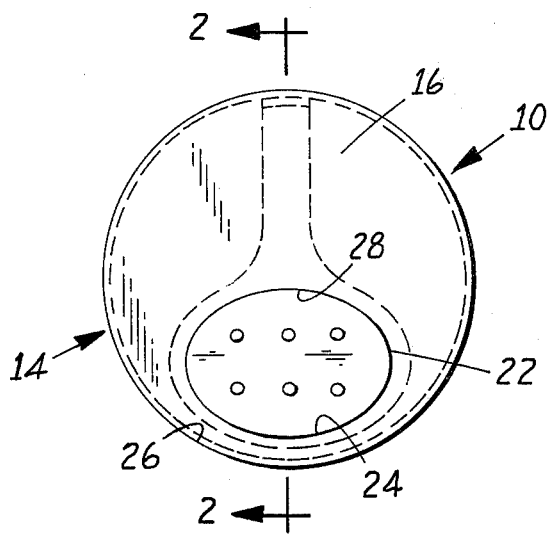
FIG. 1.
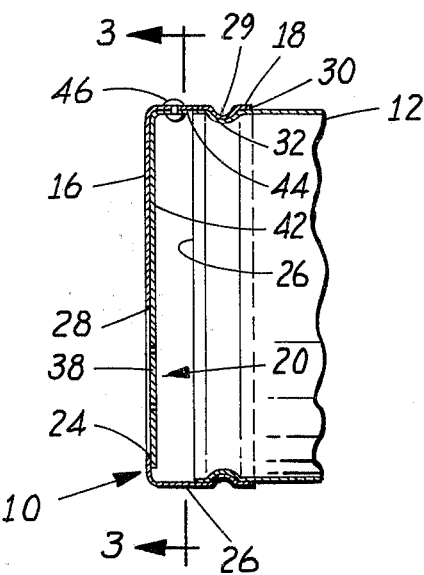
FIG. 2.
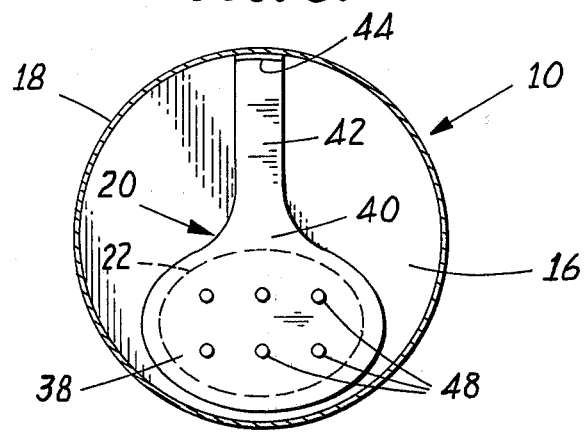
FIG. 3.
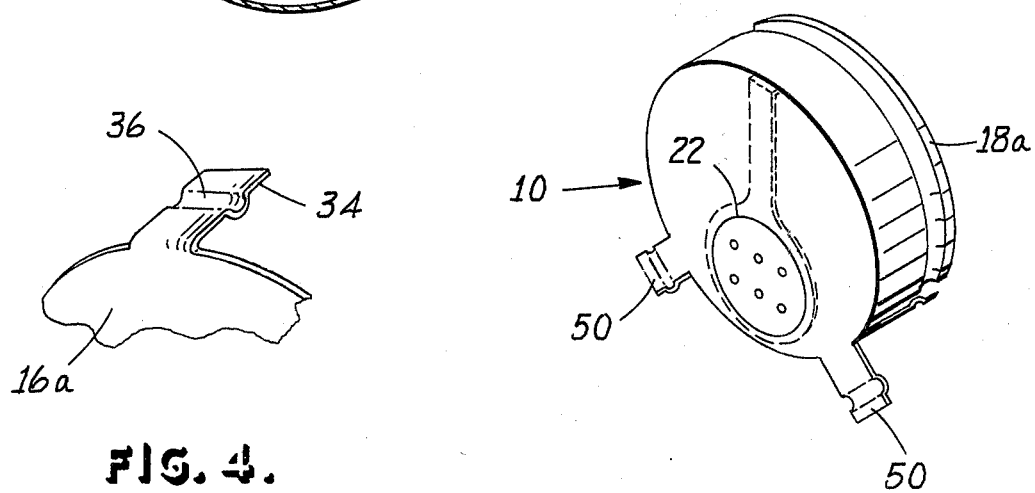
FIG. 4.
FIG. 5.

DISPOSABLE ANIMAL TRAP

BACKGROUND OF THE INVENTION

1. Field of the Invention

The present invention relates to traps for animals; more particularly, it relates to disposable traps for capturing mice and the like.

2. Description of the Prior Art

Various types of mechanisms have been devised for trapping small animals such as mice and other small rodents. These are generally one of two types: a first type which employs a spring activated element which, when tripped by the animal, for example when it disturbs the bait, snaps onto the animal, killing or maiming it and also securing the animal to the trap; and a second, more humane type, in which the live animal is retained in an enclosure by some type of closing door or gate after it enters the enclosure to obtain the bait.

The first type mentioned is generally unsatisfactory for many reasons. For example, the animal may steal the bait without tripping the spring activated element. The bait is exposed and pets or children may be injured by the trap in attempting to remove the bait. Such traps, which are normally intended for reuse, become very unsanitary and contaminated and also accumulate an odor which may repel other mice or rodents. Also, the caught animals must be manually removed from the trap and disposed of; a task many users find extremely unpleasant and dangerous, particularly if the animal has been seriously hurt rather than killed. Still another disadvantage is that animals trapped by such type of traps are generally killed or later die, and it may be desired, for example for medical purposes, to catch the animal uninjured.

For these and other reasons, the second type of trap mentioned is generally preferred. With use of such type traps, the captured animal is uninjured and, if desired, may be released in another location. Alternatively, a painless killing bait, such as warfarin, may be used within the trap, and the animal dies in the trap whereby it may easily be disposed of. Or the live captured animal is available for medical tests.

Variations of this second type of animal trap are disclosed by Schnickerling, Golaszewski, Hall, Butcher and Worfford (U.S. Pat. Nos. 741,935; 2,562,663; 1,063,347; 1,085,970 and 2,553,157 respectively). The last three enumerated are particularly directed to small traps which may be disposed of along with the captured animal, if desired.

However, disposable traps heretofore available have been too costly for practical use where large numbers of animals are to be trapped for instance around farms, large graineries and warehouses. Further, most of such traps employ a gravity activated trap door and, hence, the trap must be maintained in a particular orientation. If the orientation is changed by the animal as it enters or as it attempts to escape, or by other means, the trap door will not function properly and the animal may escape. Thus, considerable time and care must be taken to secure such traps in the necessary orientation.

SUMMARY OF THE INVENTION

A disposable trap for small animals comprises a disposable container, a cap attached to the open end of the container, such cap having a comparatively large opening therein for admitting an animal into the trap, and a closure element which is attached to the inside of the cap. A lower portion of the closure element covers the cap opening, edge portions thereof projecting sideways beyond the opening too. An upper portion of the closure element is narrow, elongate and flexible to allow the lower portion to be easily pushed away from the opening, back into the container, by an animal entering the trap and to urge the lower portion back into its initial position covering the opening when the animal has entered the trap, thereby trapping the animal. The overlapping edge portions of the lower portion prevent a trapped animal from pushing the lower portion out through the opening. One or more apertures are provided in the lower portion to enable an animal to scent bait placed in the trap.

More specifically, a flange provided around the cap slips over the open end of the container. An annular projection is provided on the inside of the flange to grip containers having an annular end groove or ridge. Alternatively, a plurality of tabs may be employed in place of the flange. A pair of legs may be provided to prevent the trap from rolling.

In this manner a trap is provided whose closing depends upon spring action rather than gravity, the spring action causing closing of an opening, thereby trapping the animal alive in a container. The trap is economically produced so that the entire trap including the cap and container (which may be a soft drink or beer can), with the entrapped animal, may be disposed of, thereby providing a sanitary means for trapping small animals such as mice. The cap is, however, removable from the container so that, if desired, the trapped animal may be removed and the trap reused.

BRIEF DESCRIPTION OF THE DRAWINGS

FIG. 1 is a front elevational view of the trap, and shows the aperture whereby the animal enters the trap;

FIG. 2 is a vertical sectional view of the trap along the line 2—2 of FIG. 1;

FIG. 3 is a rear elevational view along the line 3—3 of FIG. 2;

FIG. 4 is a partial perspective view showing use of bent-over mounting tabs; and FIG. 5 is a partial perspective view showing use of bent-down stability tabs.

DESCRIPTION OF THE PREFERRED EMBODIMENT

Referring to FIGS. 1, 2 and 3 the disposable, small animal trap comprises generally a cap or lid assembly 10 which is detachably mounted to an enclosure or container body 12 which may be, for example, an empty beverage can with the upper end thereof removed. The cap assembly includes a fixed cap portion 14 having a flat end plate 16 and a rearwardly directed flange 18 around the periphery of such plate, and a partially movable, one way door element 20 which is attached to the inside of the cap portion.

More particularly, the end plate 16 is formed of thin material, such as aluminum, in a generally circular shape which may be approximately 2½ inches (6.32 cm) in diameter when the assembly 10 is to be used with a conventional, cylindrical soft drink or beer can. In a lower region of the plate 16, a comparatively large opening or aperture 22 is formed for admitting a small animal such as a mouse into the trap. A bottom edge 24 of the opening 22 is located a short distance above a lower edge 26 of the plate 16 so that an animal may have easy access to the opening when the trap is placed with such lower edge down. An upper edge 28 of the opening is located at about the center of the plate 16.

The opening 22 is illustrated as being oval in shape to provide a comparatively large opening for easy passage of an animal into the trap. It is to be appreciated, however, that an unrestricted opening of substantially any shape may be employed.

Preferably, the flange 18 is formed entirely around the periphery of the plate 16, the plate and the flange being formed from a single piece of sheet material. The flange 18 projects rearwardly approximately one half inch (1.27 cm) so that the cap assembly may be securely fitted over an open end 26 of the can 12.

An inwardly directed annular groove or detent means 28 is formed around the flange 18, near a rear edge 30 thereof. Upon installation of the cap assembly 10 upon the can 12, the groove 28 projects inwardly into a generally mating groove or recessed end region 32 which is generally found in most types of beverage cans, particularly all aluminum cans. This mating of the grooves 28 and 32 helps prevent unintentional dislodgment of the cap assembly 10 from the can 12, for example, by the actions of an entrapped animal in attempting to escape. If, however, there is no groove 32 on the can 12, the bottom of the groove 28 tends to retain the cap assembly 10 on the can by friction.

The cap assembly 10 can, however, be pulled off from the can 12 relatively easily if it is desired to remove a captured animal from the trap.

Alternatively, as shown in FIG. 4, the flange 18 may be replaced by a plurality of narrow tabs or ears 34 (only one being shown) which have substantially the same longitudinal cross section as the flange. A groove 36 is formed on the tabs 34 to engage the can groove 32.

The door element 20 includes (FIG. 3) an oval shaped lower portion 38 which is constructed to be slightly larger (at least in portions thereof) than the opening 22 which it is designed to cover. Stated otherwise, edge portions of the lower portion 38 overlap portions of the plate 16 around the opening 22. Above the top of the lower portion 38, the element 20 narrows fairly abruptly and symmetrically at a region 40, to a comparatively narrow, elongate upper portion 42, at the upper end of the upper portion 42, a short, rearwardly attachment flange 44 (FIG. 2) may be provided. The element 20 is otherwise substantially flat in its normal position. By means of a rivet 46 through the flanges 44 and 18, the element 20 is secured to the cap portion 14, with the other face of the element in contact with, or closely adjacent to, the inner surface of the plate 16.

The flange 44 may, however, be eliminated and the element 20 attached to the plate 16, for example, by a rivet (not shown) near the upper end of the upper portion 42. Other means of attachment, including spot welding, may also be used.

The element 20 is constructed from a thin sheet of springy material, such as beryllium-copper, tempered or hard aluminum or plastic. The width of the upper portion 42 and the sheet thickness are such as to enable a small animal entering through the opening 22 to easily deflect the lower portion 38 rearwardly (into the can 12) and yet to cause or urge the lower portion to return to its initial position (covering the opening 22) to prevent escape of the animal from the trap. (The lower portion cannot be pushed outwardly through the opening 22 from the inside of the trap because of the overlapping of the lower portion edges over the plate 16 around the opening). Thus, the upper portion 42 of the element 20 functions as a leaf spring, causing effective closing of the opening 22 by the lower portion 38 in any orientation or angle of the trap without the necessity for reliance upon gravity.

In order than an animal in the vicinity of the trap will be attracted to the opening 22 thereof by the smell of bait contained within the trap, several small or aperture openings 48 are provided in the lower portion 38 of the element 20, in the region of the opening. A single such opening 48 may also be employed.

Because closure of the opening 22 is effected by spring action instead of gravity, great care in placing the traps is not required, it being merely necessary to block rolling of the trap in some manner, for example by wedging the trap between boxes or bags, to prevent movement which might startle an investigating animal. It is within the scope of the invention, however, to provide a pair of downwardly bent legs or tabs 50 (FIG. 5), which may be formed from cut portions of the flange 18, and which are positioned to prevent rolling of the trap.

In the manner illustrated and described, a very inexpensive —and thus economically disposable—trap for mice and the like is constructed. Because of its low cost it may be disposed of with the trapped animal. Although, the cap assembly 10 may, if desired, be removed from the can 12 so that the captured animal can be disposed of and the trap reused. The trap is also simple to use as no particular attention need be given to placing the trap in a particular orientation or at a particular angle in order that the trap door be closed behind the entering animal.

The above description is given by way of illustration and example only. Other variations, not shown, may be employed, including, for example, jarring threads on the flange 18 whereby the cap assembly 10 may be screwed onto threaded containers such as glass jars. In addition, the size of the trap may be varied according to the type of animal sought to be captured. It is thus to be clearly understood that the scope of the invention is limited solely by the appended claims.

What is claimed is:

1. A disposable trap for animals which comprises:
   a. a disposable container,
   b. a cap attached to said disposable container,
   said cap including means for removably retaining said cap upon said container,
   said cap having an opening in the lower portion thereof for the passage of an animal therethrough, and
   c. a closure element having a large lower portion for covering said opening, and having a narrow, elongate resilient upper portion, defining an integral springlike neck.
   said upper portion being attached to the inside of said cap so that said lower portion is normally positioned immediately behind said opening, to maintain said opening normally closed,
   said upper portion being of a size and resilience to allow said lower portion to be pushed into the trap by an animal entering through said opening and thereafter urging said lower portion back to
   the normally closed position covering said opening to trap the animal,
   said lower portion having one or more apertures through which an animal may scent bait placed in the trap and having edge regions extending beyond portions of said cap adjacent said opening, whereby said lower portion is prevented from being pushed outwardly through said opening by an entrapped animal.

2. The invention of claim 1, wherein said cap retaining means includes a flange around the edge of said cap.

3. The invention of claim 2, wherein said flange has an annular projection adapted for contacting a generally mating annular depression of said container.

4. The invention of claim 1, wherein said cap retaining means includes a plurality of tabs bent generally at right angles to the face of said cap.

5. The invention of claim 4, wherein said tabs have projections adapted for contacting portions of a generally mating annular depression of said container.

6. The invention of claim 1, including a pair of tabs adapted for resting upon a surface, whereby said trap is substantially prevented from being overturned by the animal to be trapped.

* * * * *